United States Patent
Rust

(10) Patent No.: US 9,302,771 B2
(45) Date of Patent: Apr. 5, 2016

(54) LIGHTING

(75) Inventor: Daniel Alan Rust, Norwich (GB)

(73) Assignee: SAF-T-GLO LIMITED, Swaffham (GB)

( * ) Notice: Subject to any disclaimer, the term of this patent is extended or adjusted under 35 U.S.C. 154(b) by 358 days.

(21) Appl. No.: 13/348,991

(22) Filed: Jan. 12, 2012

(65) Prior Publication Data

US 2012/0176808 A1 Jul. 12, 2012

(30) Foreign Application Priority Data

Jan. 12, 2011 (GB) .................................. 1100484.3

(51) Int. Cl.

| | |
|---|---|
| *B60L 1/00* | (2006.01) |
| *B64D 11/00* | (2006.01) |
| *B64D 47/02* | (2006.01) |
| *H02J 9/06* | (2006.01) |
| *B64D 45/00* | (2006.01) |

(52) U.S. Cl.
CPC ............. *B64D 11/00* (2013.01); *B64D 47/02* (2013.01); *H02J 9/065* (2013.01); *B64D 2011/0038* (2013.01); *B64D 2045/007* (2013.01); *B64D 2203/00* (2013.01)

(58) Field of Classification Search
CPC .................... B64D 11/00; B64D 47/02; B64D 2011/0038; B64D 2045/007; B64D 2203/00; H02J 9/065

USPC ........................................................... 307/9.1

See application file for complete search history.

(56) References Cited

U.S. PATENT DOCUMENTS

| | | | |
|---|---|---|---|
| 5,850,113 A | 12/1998 | Weimer et al. | |
| 2005/0141226 A1 | 6/2005 | Wisch et al. | |
| 2007/0271686 A1 * | 11/2007 | Rast ................................. | 2/410 |
| 2010/0033980 A1 | 2/2010 | Vogel et al. | |

FOREIGN PATENT DOCUMENTS

| | | | |
|---|---|---|---|
| EP | 1434339 A2 | | 6/2004 |
| EP | 1681908 A1 | * | 7/2006 |
| EP | 2148306 A2 | | 1/2010 |
| JP | 06-342693 | | 12/1994 |
| WO | 2006077088 A1 | | 7/2006 |

* cited by examiner

*Primary Examiner* — Daniel Cavallari
(74) *Attorney, Agent, or Firm* — Greer, Burns & Crain, Ltd.

(57) ABSTRACT

Emergency lighting for an aircraft has a primary power source for light units provided by the normal aircraft power supply and a secondary power source provided by power supply units operable to back-up the primary power source. Each light unit may have its own power supply unit operable to power the light unit in an emergency if the normal aircraft power supply fails or is otherwise unable to power the emergency lighting. Each power supply unit includes one or more electric double layer capacitors that are charged whenever the normal aircraft power supply is operational to provide the primary power source. The useful life of the electric double layer capacitors may be prolonged by reducing the capacitor voltage when the emergency lighting is switched off.

14 Claims, 1 Drawing Sheet

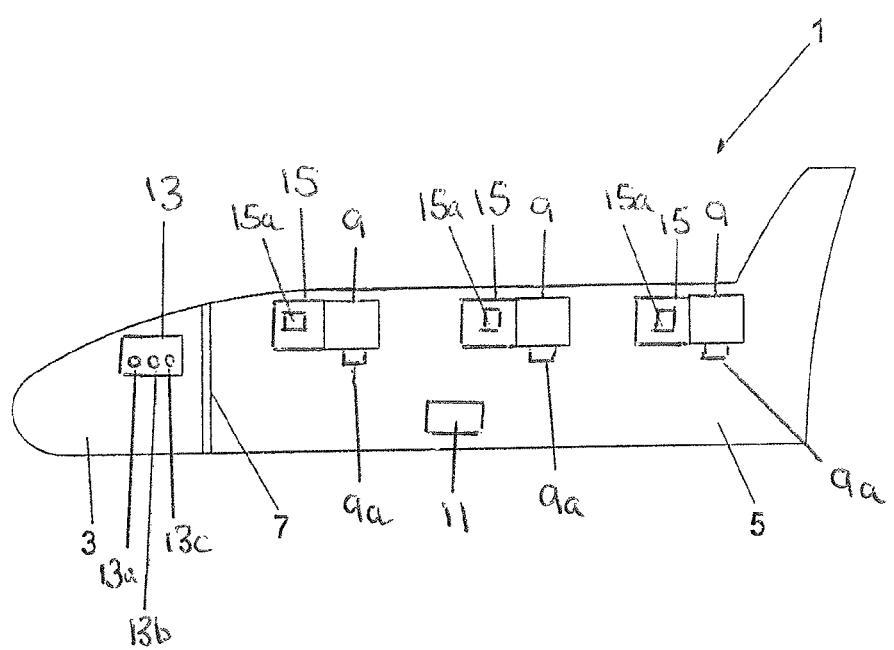

LIGHTING

FIELD OF THE INVENTION

This invention concerns improvements in or relating to lighting and in particular, but not exclusively, emergency lighting for a passenger transport vehicle such as an aircraft, train, ship and the like so as to guide passengers to an exit when the vehicle is evacuated. The invention further relates to power sources for such units and more especially to a method of monitoring or checking the condition of the power source to provide an indication when the power source may need to be replaced/recharged. The invention has application to emergency lighting both for fitting to new vehicles and for retro-fitting to existing vehicles. For convenience, the invention is described hereinafter for use in aircraft but it will be understood the invention has application to other passenger vehicles and in at least some aspects may have application to buildings, especially in a wayfinding system to assist evacuation in an emergency.

BACKGROUND OF THE INVENTION

Conventional electrically powered lighting systems provided in aircraft for normal use are hard wired with electrical wiring connecting individual light sources to a remote power source, typically storage batteries. Such systems may be rendered inoperable following an accident if the electrical wiring connections to the power source are damaged. For example, the electrical wiring connections may be broken by impact damage to the structure of the aircraft, and/or by fire and/or by water if the aircraft has to make an emergency landing on land or in the sea.

For this reason, it is a mandatory requirement to fit aircraft with emergency lighting systems at ceiling and floor level that are operable independently of the normal lighting system to provide back-up in the event of failure of the latter and to assist evacuation of the aircraft.

We have previously proposed using batteries as a back-up to the aircraft power supply so that, under normal conditions when the emergency lighting is not required, operation of the light units, for example during installation and routine testing of the units, is powered by the aircraft power supply. As a result, the battery power supply is conserved for operating the light units in an emergency when the aircraft power supply fails or the wiring between the aircraft power supply and the light units is damaged or broken such as following a crash.

The provision of batteries as the power source in an emergency can however give rise to issues of reliability due to the life limits of batteries and the present invention seeks to provide an alternative power source for emergency lighting, particularly, but not exclusively, for use in aircraft.

SUMMARY

According to one aspect of the invention we provide emergency lighting for an aircraft (or other vehicle or possibly a building) wherein a power source for illumination in an emergency is provided by one or more electric double-layer capacitors.

The invented emergency lighting replaces batteries as the power source with electric double-layer capacitors. By using electric double-layer capacitors, the problems inherent with battery life may be overcome or at least mitigated resulting in a more reliable system of emergency lighting.

The power source provided by the one or more electric double-layer capacitors may provide the sole power source for the emergency lighting. More preferably, however, the emergency lighting is powered by the aircraft power supply so that routine checking of the emergency lighting may be carried out under normal conditions independently of the electric double-layer capacitors which provide an auxiliary or secondary power source operable to back-up the aircraft power supply so that the emergency lighting can operate in an emergency (or at any other time) if the aircraft power supply is disabled for any reason.

Preferably, the electric double-layer capacitors of the auxiliary or secondary power source are charged whenever the aircraft power supply is operational. It may be that the capacitors are constantly charged using up to a maximum amount of current from the aircraft power supply whenever it is available. It may be that an amount of the power output from the auxiliary or secondary power source may be taken from the aircraft power supply when it is available up to a limit to reduce the effect of usage on the internal storage of the capacitors.

Electric double-layer capacitors can be fully charged in a much shorter period of time than is possible with batteries. As a result, even if the capacitors are fully discharged, they can be re-charged quickly when the aircraft power supply is operational to meet the operating requirements for the emergency lighting and reduce the potential for departure delays.

Preferably, means is provided for checking that the electric double-layer capacitors meet the operating requirements for the emergency lighting. We may measure the charge capacity. We may use voltage as a measure of charge capacity. It may be that the capacitor voltage is checked when the emergency lighting is switched off. Maintaining electric-double layer capacitors with a high voltage level may reduce their service life. It may be that the capacitor voltage is reduced when the emergency lighting is switched off. This may prolong the life of the capacitors in service. The capacitor voltage may be reduced by a pre-determined amount irrespective of the condition of the capacitor when the emergency lighting is switched off as the capacitor is rapidly charged when the aircraft power supply is available.

The emergency lighting may comprise a plurality of light units each having one or more light sources. The or each light source may be of any suitable type and is preferably replaceable. It may that the or each light source comprises at least one light emitting diode (LED). By employing LEDs as the light source, current draw on the power source is reduced. This may be of particular benefit when using one or more electric double-layer capacitors as the power source due to the lower energy storage density of such capacitors compared with batteries.

Preferably, means is provided for determining the initial value of the loads (light sources) attached to the power source and subsequently checking the loads to identify a change from the initial value indicating a fault in the emergency lighting. Detected faults may be signalled to a master control unit or a diagnostic panel. Alternatively, detected faults may be signalled by switching the outputs on and off in a sequence or at a level known to represent a particular fault. It may be that the loads can be switched in different sequences/levels/patterns to represent different faults, for example low capacity, load low, load missing etc.

A separate power source comprising one or more electric double-layer capacitors may be provided for each light unit. Alternatively, a common power source comprising one or more electric double-layer capacitors may be provided for two or more light units. In this case, one of the light units may be provided with the power source to which the or each additional light unit to be powered by the same power source can be connected. Alternatively, a power source comprising one or more electric double-layer capacitors for one or more light units may be provided in a separate power unit to which one or more light units may be connected. All configurations of light units and power sources are envisaged and within the scope of the invention.

Light units and, where provided separate power units may be fitted either as original equipment in a new aircraft or retrofitted to replace emergency lighting in an existing aircraft. In this respect, the use of units that can be easily located and installed in place of existing emergency lighting and/or at other positions in the aircraft facilitates retrofitting with minimum disruption to the aircraft. For example, retrofitting may be carried out during part of the aircraft service or maintenance schedule.

This aspect of the invention may include any feature or combination of features from any other aspect of the invention herein.

According to another aspect of the present invention, we provide retrofit emergency lighting for aircraft comprising LED lighting combined with a back-up power supply containing one or more electric double layer capacitors.

LEDs may be incorporated in light units configured to replace existing light units provided with incandescent light sources. The LED light units preferably contain all of the control circuitry necessary to mimic the light unit it replaces without additional hardware for full functionality.

LEDs combine reliability and efficiency with low power consumption. As a result, electric double layer capacitors can be employed that fit within a space envelope similar to that of the battery pack and charger combination previously employed as the backup power supply. In this way, it may be that a single unit containing both LEDs and electric double layer capacitors can be provided as a standalone assembly.

Preferably, means is provided for testing the back-up power supply and determining if the back-up power supply meets the requirements to operate the emergency lighting.

The test means may be configured to determine if the back-up power supply has sufficient energy to operate the emergency lighting for a pre-determined period of time. For example, current regulations require the emergency lighting for aircraft to have an operating capability of at least 10 minutes. It will be understood that the back-up power supply can be adapted as necessary to accommodate changes in the regulations that may alter the minimum operating requirements.

The test means may generate a signal representative of the condition of the back-up power supply. Thus, a visual and/or audible signal of the condition of the back-up power supply may be provided by any suitable means such as by illuminating a lamp or sounding a buzzer. A fail signal may be provided when the back-up power supply does not meet the minimum operating requirements. A pass signal may be provided when the back-up power supply meets the minimum operating requirements. A traffic light system may be employed where a fail signal is indicated by a red light, a pass signal is indicated by a green line. A borderline pass signal may be indicated by a yellow light.

Preferably, operation of the test means takes place automatically as part of the normal aircraft routine so as to ensure that the condition of the back-up power supply is regularly checked. For example, before a flight, the emergency lighting may be switched from an "off" condition to an "armed" condition as part of a start-up routine allowing the emergency lighting to be switched to an "on" condition if required during a flight manually or automatically. At the end of the flight, the emergency lighting may be switched back to the "off" condition as part of a shut-down routine. The test means may be operated automatically in response to the emergency lighting being switched between the "off" and "armed" conditions and is preferably operated when the emergency lighting is switched to the "off" condition. In this way, if the test means indicates the back-up power supply does not meet the requirements for operating the emergency lighting, any necessary work to meet the operating requirements can be carried out before the next flight.

Preferably, the test means is operable to determine the condition of the back-up power supply against a real load. Where the back-up power supply comprises one or more electric double layer capacitors, this enables the level of remaining charge to be determined reliably and without fully discharging the back-up power supply. Little or no loss of charge occurs when the emergency lighting is in the "off" condition with the result that a test that indicates the back-up power supply meets the operating conditions when the emergency lighting is switched to the "off" condition is sufficient to ensure that the operating requirements will also be met when the emergency lighting is next switched to the "armed" condition irrespective of the time interval in-between.

Furthermore repeated testing on a regular basis will have little or no impact on the useful service life of the back-up power supply as the test does not fully discharge the back-up power supply. Furthermore the test does not have to determine the actual charge remaining, only that there is sufficient charge available the next time the emergency lighting is switched to the "armed" condition that the operating requirements will be met if the emergency lighting is then switched to the "on" condition.

A capacitor under discharge follows a pre-determined voltage/time curve or line depending on the load applied. Thus, by applying a load and measuring changes in capacitor terminal voltage over time (or change in time for a fixed voltage) we can determine either the amount of energy stored in the capacitor (if the load is known and controlled) or by extrapolation that adequate energy is stored in the capacitor for a given application (where the load may not be known but is the normal driven load for the capacitor and must be supported for a pre-determined time period). The amount of energy consumed in this measurement may be small and the time short, leaving the capacitor adequately charged with a known quantity of stored energy. Additionally, a determination of internal effective series resistance may be made by measuring the change in capacitor terminal voltage before and after the load is removed. The test means may be employed in any other aspect of the invention.

This aspect of the invention may include any feature or combination of features from any other aspect of the invention herein.

According to a further aspect of the invention, we provide an emergency lighting power supply for an aircraft wherein a power source in an emergency is provided by one or more electric double layer capacitors.

The emergency lighting may be as described in connection with the preceding aspects of the invention. The charge of the or each internal electric double layer capacitors may be reduced in an "off" condition of the emergency lighting to increase capacitor useful life. Other features of the emergency lighting power supply may be as described in connection with the previous embodiments.

This aspect of the invention may include any feature or combination of features from any other aspect of the invention herein.

In preferred embodiments according to any of the preceding aspects of the invention, a method of checking the condition of the one or more electric double layer capacitors may be employed that measures the rate of change in capacitor terminal voltage during an energy transfer into or out of the capacitor.

By this method an indication of the energy stored in the capacitor may be obtained. The method may be used to establish the actual quantity of energy stored. Alternatively, the method may be used to establish that the quantity of energy stored is equal to or greater than a pre-determined minimum or threshold level suitable for the intended application.

Checking the condition of a capacitor in this way can be used for applications such as emergency lighting in aircraft where the capacitor may be used to provide a power supply to operate the emergency lighting if there is a failure in the normal aircraft power supply. In such application, it is desirable to check the condition of the capacitor on a regular basis to ensure that there is a sufficient store of energy available to operate the emergency lighting if required.

The rate of change in capacitor terminal voltage may be determined in a variety of ways. For example, in one arrangement, the normal driven load may be used to effect the energy transfer and the change in terminal voltage over a fixed time compared to a threshold to determine if there is sufficient energy stored in the capacitor. In another arrangement, the load is known and the time is fixed and the change in terminal voltage of the capacitor may be used to determine the capacitance of the capacitor. In another arrangement, the load is known and the change in terminal voltage of the capacitor is fixed and the time required for the terminal voltage change to occur may be used to determine the capacitance of the capacitor. In another arrangement, energy is transferred at a known rate and the rate of change in terminal voltage of the capacitor used to determine the capacitance of the capacitor.

According to another aspect of the invention, we provide a method of checking the condition of a capacitor, preferably an electric double layer capacitor, by measuring the rate of change in capacitor terminal voltage during an energy transfer into or out of the capacitor.

By this method an indication of the energy stored in the capacitor may be obtained. The method may be used to establish the actual quantity of energy stored. Alternatively, the method may be used to establish that the quantity of energy stored is equal to or greater than a pre-determined minimum or threshold level suitable for the intended application.

Checking the condition of a capacitor in this way can be used for applications such as emergency lighting in aircraft where the capacitor may be used to provide a power supply to operate the emergency lighting if there is a failure in the normal aircraft power supply. In such application, it is desirable to check the condition of the capacitor on a regular basis to ensure that there is a sufficient store of energy available to operate the emergency lighting if required.

The rate of change in capacitor terminal voltage may be determined in a variety of ways. For example, in one arrangement, the normal driven load may be used to effect the energy transfer and the change in terminal voltage over a fixed time compared to a threshold to determine if there is sufficient energy stored in the capacitor. In another arrangement, the load is known and the time is fixed and the change in terminal voltage of the capacitor may be used to determine the capacitance of the capacitor. In another arrangement, the load is known and the change in terminal voltage of the capacitor is fixed and the time required for the terminal voltage change to occur may be used to determine the capacitance of the capacitor. In another arrangement, energy is transferred at a known rate and the rate of change in terminal voltage of the capacitor used to determine the capacitance of the capacitor.

The method may be applied to check the condition of a unit comprising one or more capacitors where the unit is deployed to provide a power supply for any of the other aspects of the invention described herein.

According to another aspect of the invention, we provide an emergency lighting system for a passenger vehicle, especially an aircraft, wherein the system is tested when the system is switched from an "armed" condition to an "off" condition.

The "armed" condition is normally employed when the vehicle is in use and the "off" condition is normally employed when the vehicle is not in use. In the "armed" condition, the lighting system can be switched to an "on" condition manually or automatically. Power for the lighting system in the "on" condition may be provided by the vehicle power supply or by the back-up power supply or by a combination of the vehicle power supply and the back-up power supply.

Power may be supplied to the emergency lighting system from power supply units incorporating storage capacitors, preferably electric double layer capacitors. When switched to the "off" condition the storage capacitors may be partially discharged such that they require only a small time to recharge to full capacity before their next use (once placed back in the "armed" condition) so that the reduction in bias voltage during potentially long periods of time in the "off" condition produces an increase in capacitor useful life.

Existing regulations require emergency lighting systems for aircraft to be tested once every day (or 24 hours). Currently, it is common practice to carry out such testing each day when the aircraft is first put into service. If a fault is detected at this stage that requires a repair, this may result in the aircraft being delayed and missing a take-off slot. Also, faults that may develop in the system after such testing are only detected the following day when the system is next tested. Aircraft may take off and land several times during the day and the existing regulations only ensure that the emergency lighting is operational for the first flight following the test.

By this aspect of the invention the system is preferably tested whenever the system is switched to the "off" condition. As a result, any faults that are detected at this stage can be rectified when the vehicle is not in use. In this way, the operating capability of the emergency lighting when the vehicle is next used may always be assured.

In the case of emergency lighting on aircraft, the system may be switched to the "off" condition at the end of each flight which may result in the system being tested more than once a day. This may reduce or prevent delays caused when the emergency lighting is only tested once a day, typically when the aircraft is first put into service.

The testing may check any aspect of the emergency lighting system. It may be that testing includes a check on a back-up power supply to ensure there is sufficient reserve power available to operate the system in an emergency if the vehicle power supply is not available or is reduced to a level below that required to operate the system. It may be that testing includes a check on the light sources to ensure that a sufficient number are in working order for the system to be effective in an emergency.

In one embodiment of the invention, power is supplied to the aircraft emergency lights from power supply units incorporating electric double layer capacitors ("Ultra Capacitors"). The aircraft emergency lights may be those originally fitted to the aircraft, replacement lamps forming part of the embodied invention or any combination thereof. The electric double layer capacitors are charged to full or adequate capacity in the "armed" condition, but charged or reduced to a lower capacity in the "off" condition to lengthen capacitor useful life. Automated checking of the power supply or the emergency lights may be employed. Alternatively such automated checking may be dispensed with and replaced by manual periodic testing and checking procedures to reduce power supply complexity and therefore increase reliability.

This aspect of the invention may include any feature or combination of features from any other aspect of the invention herein.

Aspects of the invention will be more fully understood from the following description of an exemplary embodiment with reference to the accompanying drawing.

BRIEF DESCRIPTION OF THE DRAWING

FIG. 1 depicts an emergency lighting system embodying the invention.

DETAILED DESCRIPTION OF THE EXEMPLARY EMBODIMENTS

Referring to the drawing, an aircraft 1 has a flight deck 3 separated from the passenger cabin 5 by a bulkhead 7 having a door (not shown) for access to the flight deck 3 from the passenger cabin 5. FIG. 1 shows the aircraft with parts not relevant to understanding the invention omitted for clarity.

The aircraft 1 is provided with an emergency lighting system for directing passengers and crew to exits (not shown) when the normal aircraft lighting is not working for any reason, for example in an emergency following a crash, and the aircraft has to be evacuated in a short period of time.

The emergency lighting includes a plurality of light units generally indicated by reference numeral 9. Three light units 9 are shown but it will be understood that any number of light units 9 may be employed to suit the requirements for a given layout of the passenger cabin 5 and exits. The light units 9 may be provided at any suitable location within the passenger cabin 5, for example on the ceiling, the walls or the floor of the passenger cabin. Each light unit 9 may comprise one or more light sources 9a and in a preferred embodiment the light sources 9a are replaceable and may comprise one or more light emitting diodes. Other light sources may be employed.

A primary power source for the emergency lighting is provided by the normal aircraft power supply generally indicated by the reference numeral 11 which is connected to the light units 9 by wiring (not shown). The emergency lighting may be controlled from a control panel indicated generally by the reference numeral 13 located in the flight deck 3 for operation by the flight crew. The control panel 13 may have a switch 13a for switching the emergency lighting between an "off" condition, an "armed" condition, and an "on" condition. When switched to the "on" condition, the emergency lighting is powered by the normal aircraft power supply when available.

A secondary or back-up power supply for the emergency lighting is provided by one or more power supply units indicated generally by the reference numeral 15. In this embodiment a separate power supply unit 15 is provided for each light unit 9. This may not be essential and a power supply unit 15 may provide power for more than one light unit 9 and in some cases it may be that a single power supply unit 15 provides power for all the light units 9.

Each power supply unit 15 and associated light unit 9 may be provided as a combined light/power module unit for installation. This may be preferred when the emergency lighting is provided as original equipment for installation in a new aircraft. This is not essential and the power supply unit 15 and light unit 9 may be separate components for installation independently. This may be preferred when retrofitting the emergency lighting to an aircraft which may already have suitable light units so that it is only necessary to install the power supply units.

In accordance with a preferred feature of the invention, each power supply unit 15 has one or more electric double layer capacitors 15a also known as "ultra capacitors" that can provide power to the associated light units 9 if required. For example, if the normal aircraft power supply is not available or insufficient or fails when or after the emergency lighting is switched to the "on" condition or if the emergency lighting enters the "on" condition as a result of loss of normal aircraft power supply in the "armed" condition.

Each power supply unit 15 is preferably connected to the normal aircraft power supply 11 so that the electric double layer capacitors 15a are charged whenever the normal aircraft power supply is operational to provide the primary power source and may be constantly charged using up to a maximum amount of current from the normal aircraft power supply when operational and available. In use, part of the power output from each power supply unit 15 may be taken from the normal aircraft power supply when it is available up to a limit to reduce the effect of usage on the internal storage of the electric double layer capacitors 15a.

The control panel 13 may have a switch 13b for testing the power supply units 15 to check the emergency lighting meets the minimum operating requirements. This may involve checking that the electric double layer capacitors 15a have a voltage value at or above a pre-determined minimum value for operation of the light units 9. The control panel 13 may provide a visual indication as to state of the emergency lighting, for example pass/fail conditions may be indicated by one or more lamps 13c. The minimum operating requirements may be met even if one or more light units 9 is not operational and the control panel may provide an indication of any light units 9 that are not operational to facilitate repair/replacement of the light unit 9.

The test may be carried out when the emergency lighting system is switched from the "off" condition to an "armed" or "stand-by" condition prior to take-off. The emergency lighting can be switched from the "armed" condition to the "on" condition when required and returned to the "off" condition via the "armed" condition when not required. More preferably, however the test is carried out when the emergency lighting is switched to the "off" condition. In this way, any necessary repairs or replacement can be carried out before the aircraft is next required and flight delays which may result if the emergency lighting is testing prior to take-off may be avoided.

The test may involve measuring the rate of change in capacitor terminal voltage during an energy transfer into or out of the capacitor. The test may be used to determine the actual energy stored in the capacitor. Alternatively the test may be used to determine if the quantity of energy stored is equal to or greater than a pre-determined minimum or threshold level. A normal driven load may be used to effect the energy transfer and the change in terminal voltage over a fixed time compared to a threshold to determine if there is sufficient energy stored in the capacitor. Other means of testing may be employed.

In accordance with a preferred feature of the invention, the voltage of the electric double layer capacitors 15a is reduced when the emergency lighting is switched to the "off" condition. Little or no loss of charge occurs when the emergency lighting is in the "off" condition with the result that a test that indicates the back-up power supply meets the operating conditions when the emergency lighting is switched to the "off"

condition is sufficient to ensure that the operating requirements will also be met when the emergency lighting is next switched to the "armed" condition irrespective of the time interval in-between. By reducing the voltage the electric double layer capacitors 15a are not maintained in a fully charged condition when the emergency lighting is switched "off" and this has been found to prolong the useful life of the capacitors 15a. The capacitor voltage may be reduced by a pre-determined amount irrespective of the condition of the capacitor 15a when the emergency lighting is switched off as the capacitor 15a is rapidly charged when the normal aircraft power supply is available.

Although in the exemplary embodiment of the invention the emergency lighting is described in an aircraft, it will be understood that the invention has wider application and may be employed in ships, trains or like passenger transportation vehicles.

Any of the aspects of the invention described herein may be employed in combination with any of the other aspects of the invention and any feature of any of the aspects of the invention may be employed separately or in combination with any features from any of the other aspects of the invention. All combinations and sub-combinations of any features described herein are included within the scope of the invention.

I claim:

1. Aircraft emergency lighting having a power source for illumination of emergency lighting in an emergency, said power source including one or more electric double layer capacitors, and control means for testing said one or more electric double layer capacitors, said control means being configured to test the one or more electric double layer capacitors in response to switching off the emergency lighting.

2. Aircraft emergency lighting according to claim 1 wherein said power source including one or more electric double layer capacitors is configured to provide a secondary power source operable to back-up a primary power source provided by an aircraft power supply.

3. Aircraft emergency lighting according to claim 2 wherein, said one or more electric double layer capacitors of said secondary power source are configured to be charged whenever said aircraft power supply is operational to provide said primary power source.

4. Aircraft emergency lighting according to claim 2 wherein, said primary power source and said secondary power source are configured to reduce the effect of usage on internal storage of said one or more electric double layer capacitors.

5. Aircraft emergency lighting according to claim 1 wherein, said control means is configured to check a charge capacity of said one or more electric double layer capacitors when the emergency lighting is switched off.

6. Aircraft emergency lighting according to claim 1 wherein, said power source including said one or more electric double layer capacitors is configured to reduce a voltage of said one more electric double layer capacitors when the emergency lighting is switched off.

7. Aircraft emergency lighting according to claim 6 wherein, said power source including said one or more electric double layer capacitors is configured to reduce said voltage by a pre-determined amount irrespective of the condition of said one or more electric double layer capacitors when the emergency lighting is switched off.

8. Aircraft emergency lighting according to claim 1 further comprising a plurality of light units each having one or more light sources.

9. Aircraft emergency lighting according to claim 8 wherein, the emergency lighting is configured to determine an initial value of a load of the light sources attached to said power source including said one or more electric double layer capacitors and subsequently checking said loads to identify a change from said initial value indicating a fault in the emergency lighting.

10. Aircraft emergency lighting according to claim 1 wherein, the emergency lighting is configured to be switched between an"off" condition and an "armed" condition and said control means is configured to test said power source including said one or more electric double layer capacitors operated automatically in response to the emergency lighting being switched from said "armed" condition to said "off" condition.

11. Aircraft emergency lighting according to claim 1 wherein, said control means is configured to test said power source including said one or more electric double layer capacitors against a real load to determine a condition of said power source.

12. An aircraft having an emergency lighting system including a plurality of light units, a primary power source for said light units, a secondary power source for said light lights, said secondary power source being configured as a back-up for said primary source, wherein said secondary power source includes one or more electric double layer capacitors configured to be charged by said primary power source, and control means configured to test said one or more electric double layer capacitors of said secondary power source and provide an indication of a condition of the secondary power source in response to switching the emergency lighting from an "armed" condition to an "off" condition.

13. The aircraft of claim 12 wherein said control means is configured to check the condition of said secondary power source by measuring a rate of change in capacitor terminal voltage during an energy transfer into or out of said one or more electric double layer capacitors.

14. The aircraft of claim 12 wherein said secondary power source is configured to reduce a voltage of said one more electric double layer capacitors when the emergency lighting is switched to said "off" condition.

* * * * *